US009027017B2

(12) United States Patent
Box et al.

(10) Patent No.: US 9,027,017 B2
(45) Date of Patent: May 5, 2015

(54) METHODS AND APPARATUS FOR MOVEMENT OF VIRTUAL RESOURCES WITHIN A DATA CENTER ENVIRONMENT

(75) Inventors: Julian J. Box, Jersey (GB); Vincent G. Lubsey, Snellville, GA (US); Kevin D. Reid, Bethesda, MD (US); Karl J. Simpson, Jersey (GB)

(73) Assignee: Virtustream, Inc., Bethesda, MD (US)

( * ) Notice: Subject to any disclaimer, the term of this patent is extended or adjusted under 35 U.S.C. 154(b) by 0 days.

(21) Appl. No.: 12/709,943

(22) Filed: Feb. 22, 2010

(65) Prior Publication Data

US 2011/0209146 A1    Aug. 25, 2011

(51) Int. Cl.
*G06F 9/50*    (2006.01)

(52) U.S. Cl.
CPC .................................. *G06F 9/5077* (2013.01)

(58) Field of Classification Search
None
See application file for complete search history.

(56) References Cited

U.S. PATENT DOCUMENTS

| | | | |
|---|---|---|---|
| 7,194,616 B2 * | 3/2007 | Axnix et al. ................... | 713/100 |
| 7,664,110 B1 | 2/2010 | Lovett et al. | |
| 7,908,605 B1 | 3/2011 | Graupner | |
| 7,941,804 B1 * | 5/2011 | Herington et al. ............ | 718/104 |
| 2002/0059427 A1 | 5/2002 | Tamaki | |
| 2002/0184363 A1 | 12/2002 | Viavant et al. | |
| 2003/0028642 A1 | 2/2003 | Agarwal | |
| 2004/0111509 A1 | 6/2004 | Eilam et al. | |
| 2004/0267897 A1 | 12/2004 | Hill | |
| 2005/0039183 A1 | 2/2005 | Romero | |
| 2005/0102674 A1 | 5/2005 | Tameshige et al. | |
| 2005/0108712 A1 | 5/2005 | Goyal | |
| 2005/0120160 A1 | 6/2005 | Plouffe et al. | |
| 2005/0235286 A1 | 10/2005 | Ballew et al. | |
| 2006/0056618 A1 | 3/2006 | Aggarwal | |
| 2006/0069594 A1 | 3/2006 | Yamasaki | |
| 2006/0143617 A1 | 6/2006 | Knauerhase | |
| 2006/0161988 A1 | 7/2006 | Costea | |
| 2006/0190606 A1 | 8/2006 | Kohavi | |
| 2006/0259818 A1 | 11/2006 | Howell et al. | |
| 2007/0106796 A1 | 5/2007 | Kudo et al. | |
| 2007/0115924 A1 | 5/2007 | Schneider | |
| 2007/0118567 A1 | 5/2007 | Isokawa | |

(Continued)

FOREIGN PATENT DOCUMENTS

| | | |
|---|---|---|
| EP | 2040176 | 3/2009 |
| WO | WO 2009/072186 | 6/2009 |

OTHER PUBLICATIONS

Virtustream, Inc. PCTUS11/25390 filed Feb. 18, 2011. International Search Report—Written Opinion (Jun. 1, 2011).

(Continued)

*Primary Examiner* — Gregory A Kessler
(74) *Attorney, Agent, or Firm* — DLA Piper LLP (US)

(57) ABSTRACT

In one embodiment, an apparatus can include a monitoring module configured to send an indicator representing that performance of a virtual resource satisfies a threshold condition. The apparatus can also include a management module configured to move a set of virtual resources including the virtual resource from a first portion of data center hardware resources to a second portion of data center hardware resources mutually exclusive from the first portion of data center hardware resources in response to the indicator. The management module can be configured to define the set of virtual resources based on an operational relationship between the virtual resource and the remaining virtual resources included in the set of virtual resources.

25 Claims, 5 Drawing Sheets

(56) References Cited

U.S. PATENT DOCUMENTS

| | | |
|---|---|---|
| 2007/0250929 A1 | 10/2007 | Herington |
| 2007/0266433 A1 | 11/2007 | Moore |
| 2007/0271560 A1 | 11/2007 | Wahlert |
| 2008/0082977 A1 | 4/2008 | Araujo |
| 2008/0109549 A1 | 5/2008 | Nakagawa et al. |
| 2008/0163239 A1 | 7/2008 | Sugumar |
| 2008/0183544 A1 | 7/2008 | Matsumitsu |
| 2008/0263258 A1* | 10/2008 | Allwell et al. .................... 711/6 |
| 2008/0295096 A1 | 11/2008 | Beaty |
| 2009/0138887 A1 | 5/2009 | Uehara et al. |
| 2009/0199198 A1 | 8/2009 | Horii |
| 2009/0254572 A1 | 10/2009 | Redlich |
| 2009/0276771 A1 | 11/2009 | Nickolov |
| 2009/0293022 A1 | 11/2009 | Fries |
| 2010/0107172 A1 | 4/2010 | Calinescu |
| 2010/0241751 A1 | 9/2010 | Sonoda et al. |
| 2010/0242045 A1 | 9/2010 | Swamy |
| 2011/0093852 A1 | 4/2011 | Li et al. |
| 2011/0131335 A1 | 6/2011 | Spaltro et al. |
| 2011/0131589 A1 | 6/2011 | Beaty et al. |
| 2011/0185064 A1 | 7/2011 | Head |
| 2011/0239215 A1 | 9/2011 | Sugai |
| 2012/0110328 A1 | 5/2012 | Pate |
| 2012/0174097 A1 | 7/2012 | Levin |

OTHER PUBLICATIONS

International Search Report and Written Opinion issued in PCT/US2011/025392 on Jun. 2, 2011.
Related U.S. Appl. No. 12/709,954 electronically captured Jan. 2, 2013.
International Preliminary Report on Patnetability and Written Opinion issued in PCT/US2011/025390 on Aug. 28, 2012.
International Search Report issued in PCT/US2011/025393 on Jun. 2, 2011.
International Preliminary Report on Patentability issued in PCT/US2011/025393 on Aug. 28, 2012.
Related U.S. Appl. No. 12/709,962 electronically captured Jan. 2, 2013.
Related U.S. Appl. No. 13/595,955 electronically captured Jan. 2, 2013.
Related U.S. Appl. No. 12/709,954 electronically captured Mar. 20, 2013.
Related U.S. Appl. No. 12/709,962 electronically captured Mar. 20, 2013.
International Search Report issued in PCT/US2012/052561 dated Feb. 7, 2013.
Written Opinion issued in PCT/US2012/052561 dated Feb. 7, 2013.
Related U.S. Appl. No. 13/595,955 electronically captured on Jul. 10, 2014.
Related U.S. Appl. No. 12/709,954 electronically captured Sep. 30, 2013.
Related U.S. Appl. No. 12/709,962 electronically captured Sep. 30, 2013.
Chinese Office Action issued in CN 201180020269.0 dated Oct. 20, 2014.
English Language Translation of Chinese Office Action issued in CN 201180020269.0 dated Oct. 20, 2014.
Related U.S. Appl. No. 13/595,955 electronically captured on Jan. 7, 2014.
Related U.S. Appl. No. 12/709,962 electronically captured on Jan. 7, 2014.
Related U.S. Appl. No. 13/595,955 electronically captured Oct. 30, 2014.
Chinese Office Action issued in CN 201180020260 dated Sep. 2, 2014.
English Language Translation of Chinese Office Action issued in CN 201180020260 dated Sep. 2, 2014.
Chinese Office Action issued in CN 201180020127.4 dated Feb. 15, 2015.
English Language Translation of Chinese Office Action issued in CN 201180020127.4 dated Feb. 15, 2015.

* cited by examiner

| Virtual Resources 410 | Tier 1 Operational Relationship 420 | Tier 2 Operational Relationship 430 | Data Center Unit 440 | Capacity Consumption 450 |
|---|---|---|---|---|
| W1 | Y | Y | UC | 10% |
| W2 | Y | N | | 19% |
| W3 | Y | N | | 20% |
| W4 | Y | Y | | 25% |
| W5 | N | N | | 5% |
| W6 | N | N | | 18% |

FIG. 4A

| Data Center Unit 480 | Available Capacity 490 |
|---|---|
| UD | 10% |
| UE | 60% |
| UF | 25% |

METHODS AND APPARATUS FOR MOVEMENT OF VIRTUAL RESOURCES WITHIN A DATA CENTER ENVIRONMENT

BACKGROUND

Embodiments described herein relate generally to virtual resources within a data center, and, in particular, to methods and apparatus for movement of virtual resources within a data center environment.

Known methods for managing the operation of virtual resources within a data center can be complicated and inefficient. In particular, known methods for handling movement of virtual resources within a data center can involve labor intensive manual intervention due to various incompatible systems that control and/or manage resources (e.g., hardware resources, software resources) of a data center in a disparate and inefficient fashion. Management of virtual resource movement within a data center environment, if not handled appropriately, can adversely affect the operation of other virtual resources within the data center environment.

Thus, a need exists for methods and apparatus for movement of virtual resources within a data center environment.

SUMMARY

In one embodiment, an apparatus can include a monitoring module configured to send an indicator representing that performance of a virtual resource satisfies a threshold condition. The apparatus can also include a management module configured to move a set of virtual resources including the virtual resource from a first portion of data center hardware resources to a second portion of data center hardware resources mutually exclusive from the first portion of data center hardware resources in response to the indicator. The management module can be configured to define the set of virtual resources based on an operational relationship between the virtual resource and the remaining virtual resources included in the set of virtual resources.

DETAILED DESCRIPTION

A management module can be configured to move (or trigger movement of) a virtual resource from a first portion of data center (which can be referred to as a source portion of the data center) to second portion of a data center (which can be referred to as a destination portion of the data center). The hardware resources (e.g., host devices, access switches, aggregation devices, core switching elements) and/or software resources (e.g., operating systems, hypervisors such a VMware hypervisor) of a data center can collectively define a virtualized environment within which the virtual resources (e.g., virtual machines, guest operating systems) can operate. The hardware resources and/or software resources of the data center can be collectively referred to as data center resources. In some embodiments, the virtual resource(s) can be configured to, for example, emulate the functionality of a physical source device and/or its associated software.

The movement of one or more virtual resources, which can include, for example, movement (e.g., copying, migration) of files and/or a state of one or more virtual resource(s), can be triggered in response to a threshold condition being satisfied based on a value of a performance metric. In some embodiments, the performance metric of the virtual resource can be, for example, a utilization rate, a failure rate, and/or so forth, of the virtual resource when operating within at least a portion (e.g., a hardware and/or software resource) of a data center. In some embodiments, the management module can be configured to move additional virtual resources that have an operational relationship (e.g., an operational dependency) with the virtual resource to the destination portion of the data center as defined within a mapping of operational relationships between the virtual resources and the additional virtual resources. In some embodiments, the management module can be configured to move the virtual resource (and/or related virtual resources) when the destination portion of the data center is available to operate the virtual resource (and/or related virtual resources). In sum, the movement of one or more virtual resources can be triggered in response to a combination of factors including, (1) performance of one or more virtual resources, (2) operational relationships between the virtual resource(s), (3) the availability of destination resources (e.g., data center resources) to operate the virtual resource(s), and/or so forth.

In some embodiments, the movement of one or more virtual resources from a source portion of a data center to a destination portion of the data center can be based on a user preference of a user (e.g., a data center administrator, a client, a customer), a rules-based algorithm, and/or so forth. For example, the factors can be balanced based on a user preference and/or a rules-based algorithm to identify one or more virtual resources for movement within the data center. In some embodiments, resources of a source portion of a data center (e.g., source data center resources) and/or resources of a destination portion of the data center (e.g., destination data center resources) can be managed as data center units. Accordingly, the source and/or destination portions of the data center can be portions of the data center that are managed as data center units. In some embodiments, the source and/or destinations portions of the data center can be associated with data center clusters.

Figure 1:
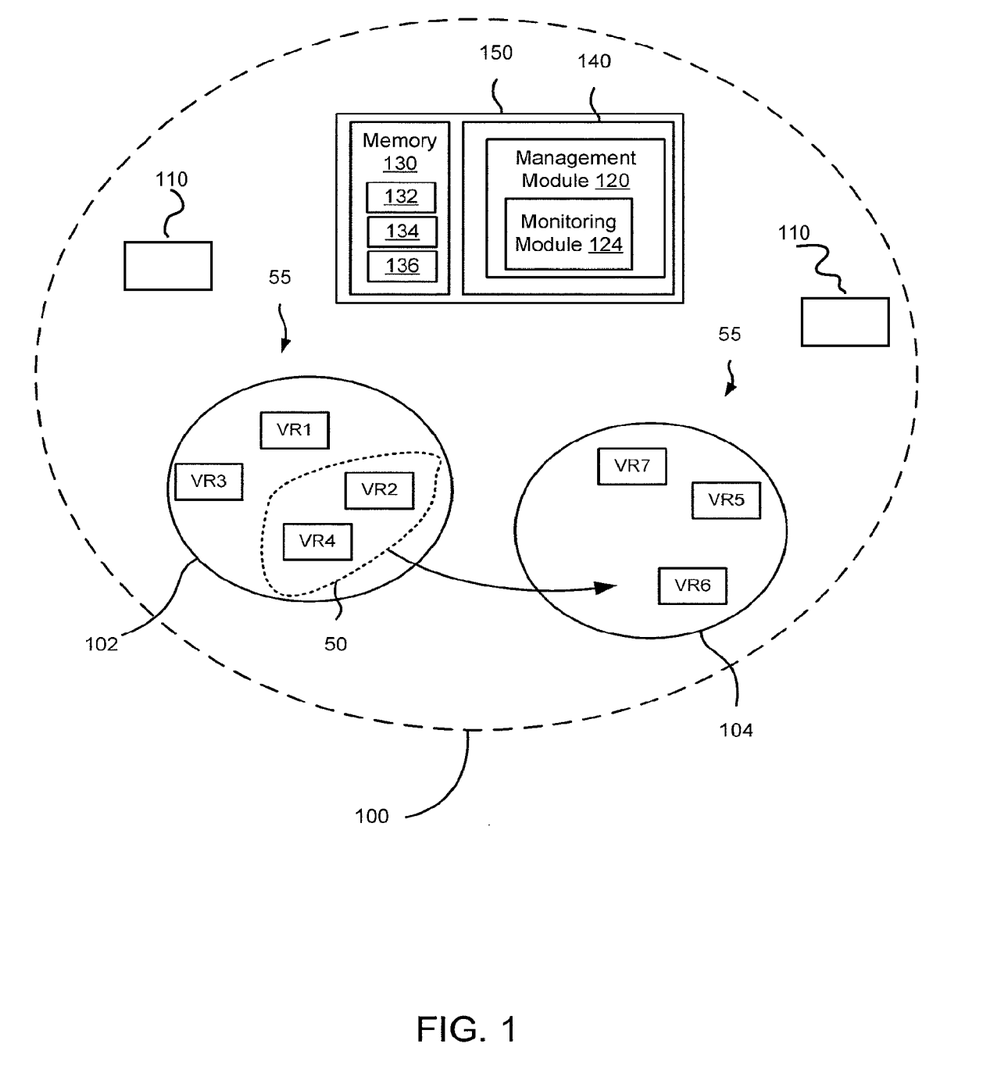
FIG. 1 is a schematic diagram that illustrates a set of virtual resources identified for movement from one portion of a data center to another portion of the data center, according to an embodiment.

FIG. 1 is a schematic diagram that illustrates a set of virtual resources 50 identified for movement from one portion 102 of a data center 100 to another portion 104 of the data center 100, according to an embodiment. Portion 102 of the data center 100 can be referred to as a source portion 102 of the data center 100, and the portion 104 of the data center 100 can be referred to as a destination portion 104 of the data center 100. The portions (i.e., the source portion 102, the destination portion 104) of the data center 100 can be resources (e.g., hardware resources, software resources, data center resources) of the data center 100. The set of virtual resources 50, which is identified for movement from the source portion 102 of the data center 100 to the destination 104 of the data center 100, includes virtual resources VR2 and VR4.

As shown in FIG. 1, the source portion 102 of the data center 100 is configured to operate virtual resources VR1 through VR4 and the destination portion 104 of the data center 100 is configured to operate virtual resources VR5 through VR7. The virtual resources VR1 through VR7 can be collectively referred to as virtual resources 55. In some embodiments, the virtual resources can be configured to emulate an application from a source device (outside of the data center 100) that has been migrated to the data center 100. More details related to migration of a source are described in co-pending patent application Ser. No. 12/709,954, filed on Feb. 22, 2010, entitled, "Methods and Apparatus Related to Migration of Customer Resources to Virtual Resources within a Data Center Environment," which is incorporated herein by reference in its entirety.

The movement of the virtual resources 50 from the source portion 102 of the data center 100 (e.g., source data center resources) to the destination portion 104 of the data center 100 (e.g., destination data center resources) can be triggered by a management module 120. As shown in FIG. 1, the management module 120 can be executed within a processor 140 of a processing device 150 and the management module 120 can include a monitoring module 124. The management module 120 (and the monitoring module 124) can have access to a memory 130 of the processing device 150. In some embodiments, the processing device 150 can be, for example, a computing device such as a server within the data center 100. In some embodiments, the processor 150 can include a memory (e.g., a level-1 (L1) cache) (not shown).

The virtual resources are selected (e.g., identified) from the virtual resources 55 for inclusion in the set of virtual resources 50 (which are to be moved) based on a combination of several factors. The factors can include, for example, (1) the values of performance metrics of one or more of the virtual resources 55 with respect to one or more threshold conditions, (2) the operational relationships (e.g., an operational dependencies) between the virtual resources 55, and (3) the availability of target resources (e.g., hardware resources, software resources) to which one or more of the virtual resources 55 can be moved (or triggered to move). Although FIG. 1 illustrates an example of virtual resources 50 identified for movement between portions (e.g., data center resources) of the data center 100, in some embodiments, the factors described above can be used to trigger movement of one or more of the virtual resources 55 within a data center portion.

The values of the performance metrics of one or more of the virtual resources 55 can be monitored with respect to the one or more threshold conditions 132 by the monitoring module 124. In some embodiments, the performance metrics of one or more of the virtual resources 55 can include, for example, a utilization rate, a failure rate, a processing speed, and/or so forth, of the virtual resource(s) 55 when operating within the source portion 102 of the data center 100. As shown in FIG. 1, a threshold condition database 132 including information representing one or more threshold conditions can be stored in the memory 120.

In the embodiment shown in FIG. 1, the virtual resource VR2 is identified for movement from the source portion 102 of the data center 100 to the destination portion 104 of the data center 100 by the monitoring module 124 of the management module 120 in response to a value of a performance metric (or a set of values of the performance metric) satisfying a threshold condition included in the threshold condition database 132. For example, the virtual resource VR2 can be identified as a virtual resource that should be moved (or triggered to move) because the performance of the virtual resource VR2 (as indicated by values of performance metrics) falls below a specified threshold level (as indicated by a threshold condition) represented within the threshold condition database 132.

In some embodiments, the monitoring module 124 can be configured to receive (e.g., collect, access) values of performance metrics related to one or more of the virtual resources 55 periodically, randomly, at specified intervals, in response to an instruction from a user, based on a user preference (which can be stored in the memory 120), and/or so forth. In some embodiments, the types of performance metric values collected by the monitoring module 124 and/or statistics calculated by the monitoring module 124 based on the performance metric values can be preselected, selected randomly, based on a preference of a user, and/or so forth. In some embodiments, the user preference can identify the performance metric values to be used by the monitoring module 124 to trigger movement of one or more of the virtual resources 55. In some embodiments, the monitoring module 124 can be configured to request and/or receive one or more performance metric values (or raw data that can be used to calculate a performance metric value) from one or more resources (e.g., hardware resources, software resources, virtual resources) of the data center 100. In some embodiments, values of performance metrics (or raw data that can be used to calculate a performance metric value) can be pushed from one or more resources of the data center 100 to the monitoring module 124.

Figure 3A:
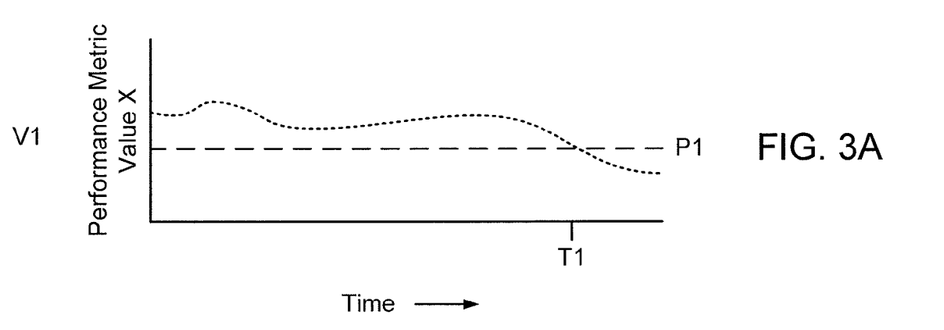
FIGS. 3A through 3C are graphs that illustrate performance metric values associated with virtual resources, according to an embodiment.
Figure 3B:
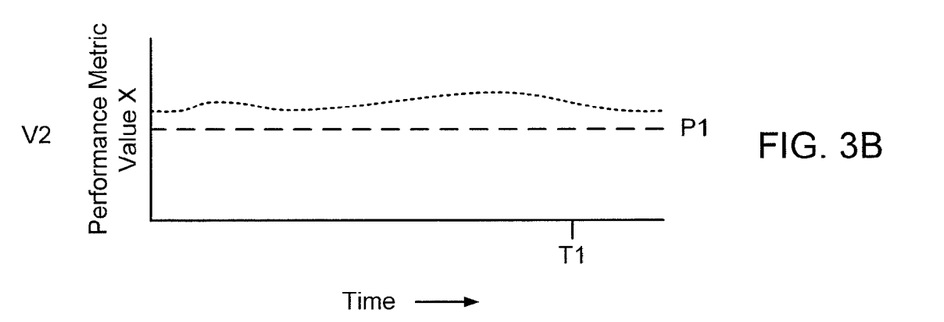
Figure 3C:
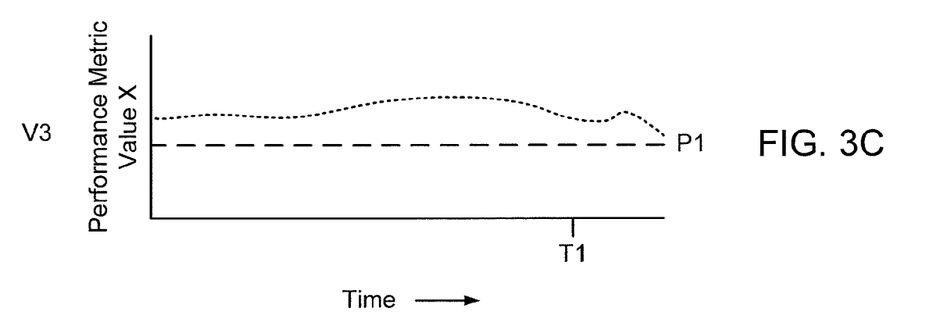

Although not shown, in some embodiments, values of performance metrics can be stored in the memory 130. The historical values of the performance metrics can be used by the monitoring module 124 to determine whether or not one or more virtual resources from the virtual resources 55 should be moved from a portion of the data center 100 to another portion of the data center 100. Examples of performance metric values associated with virtual resources are shown in FIGS. 3A through 3C.

As shown in FIG. 1, an operational relationship database 134 including information representing operational relationships between the virtual resources 55 can be stored in the memory 120. The information included in the operational relationship database 134 can represent operational dependencies between the virtual resources 55, such as a requirement that two of the virtual resources 55 operate at the same host device. This physical proximity may be needed so that the virtual resources 55 can operate in a desirable fashion. In some embodiments, the information included in the operational relationship database 134 can be referred to as a mapping of operational relationships. In some embodiments, the operational relationships represented within the operational relationship database 134 can be tiered operational relationships. An example of an operational relationship database that includes tiered operational relationships is described in connection with FIG. 4A.

In the embodiment shown in FIG. 1, the virtual resource VR4 is identified for movement from the source portion 102 of the data center 100 to the destination portion 104 of the data center 100 by the management module 120 based on an operational relationship stored in the operational relationship database 134. For example, the virtual resource VR4 can be identified as a virtual resource that should be moved with the virtual resource VR2 to the destination portion 104 of the data center 100 because VR2 may not function in a desirable fashion unless VR4 is also operating within the same destination portion 104 of the data center 100 as VR2.

In some embodiments, a virtual resource from the virtual resources 55 may not be moved from, for example, the source portion 102 of the data center 100 to the destination portion 104 of the data center 100 (or moved within a data center portion or within a set of data center resources) based on an operational relationship represented within the operational relationship database 134. For example, a virtual resource from the virtual resources 55 can be identified for movement from one portion of the data center 100 to another portion of the data center 100 in response to a value of a performance metric satisfying a threshold condition. The virtual resource, however, may not be moved (e.g., may be prevented from moving) based on an operational relationship indicating that the virtual resource would disrupt the operation of other virtual resources in an undesirable fashion. In other words, the benefits associated with movement of the virtual resource can be outweighed by disruptions that could be caused by movement of the virtual resource away from other virtual resources that have an operational relationship with the virtual resource.

As shown in FIG. 1, an availability database 136 including information representing the availability of the resources of the data center 100 can also be stored in the memory 120. The information stored in the availability database 136 can represent the capacity available in one or more portions (e.g., portions of data center resources) of the data center 100. An example of an availability database is shown in FIG. 4B.

In the embodiment shown in FIG. 1, the virtual resource VR2 and virtual resource VR4 can be moved as a set of virtual resources 50 to destination portion 104 of the data center 100 because destination portion 104 of the data center 100 has resources available, as indicated in the availability database 136, to operate the set of virtual resources 50. The management module 120 can be configured to determine, based on information represented within the availability database 136, whether or not one or more of the virtual resources 55 can be moved from one portion of the data center 100 (e.g., one portion of data center resources) to another portion of the data center 100 (e.g., another portion of data center resources).

In some embodiments, one or more virtual resources from the virtual resources 55 may not be moved from, for example, the source portion 102 of the data center 100 to the destination portion 104 of the data center 100 (or moved within a data center portion) based on a lack of availability of hardware resources to operate the virtual resource(s). For example, a set of virtual resources from the virtual resources 55 can be identified for movement from one portion of the data center 100 to another portion of the data center 100 in response to a value of a performance metric satisfying a threshold condition and based on an operational relationship between the virtual resources in the set of virtual resources. One or more of the virtual resources from the set of virtual resources, however, may not be moved (e.g., may be prevented from moving) based on a lack of capacity to operate one or more of the virtual resources from the set of virtual resources at a destination portion of the data center 100.

In some embodiments, the balance between these factors—performance metric factors and operational relationship factors—can be defined in a rules-based algorithm, set of threshold conditions, and/or user preferences. The rules-based algorithm, set of threshold conditions, and/or user preferences can be used by the management module 120 to automatically resolve conflicts between these factors and determine whether or not a virtual resource from the virtual resources 55 should be moved within the data center 100.

In some embodiments, the monitoring module 124 can be configured to send a notification to, for example, a user (e.g., a data center administrator, a client, a customer) via a user interface (not shown) indicating that one or more of the virtual resources 55 should be moved. In some embodiments, the management module 120 can be configured to move (or trigger movement of) the virtual resource(s) 55 only when authorized to do so by the user. In some embodiments, the monitoring module 124 can be configured to solicit authorization from, for example, a user via the user interface for movement of one or more of the virtual resources 55. When authorization is received from the user via the user interface the monitoring module 124 can be configured to move (or trigger movement of) the virtual resources 55 within the data center 100.

In some embodiments, the management module 120 can be configured to trigger movement of one or more of the virtual resources 55 based on a schedule (e.g., a schedule stored at the memory 130). In some embodiments, the management module 120 can be configured to trigger a movement of the one or more of the virtual resources 55 so that they are operating at a first set of specified locations within the data center 100 (e.g., within the first portion 102 of the data center 100) when in a first configuration (which can be referred to as a first mode) and operating at a second set of specified locations within the data center 100 (e.g., within the second portion 104 of the data center 100) when in a second configuration (which can be referred to as a second mode). Movement between the first configuration and the second configuration can be triggered based on a schedule. In some embodiments, the movement between the modes can be referred to as a mode switch. In some embodiments, the movement between the modes can be based on, for example, temporal considerations, performance thresholds, and/or so forth. For example, the virtual resources 55 can be managed by the management module 120 so that are in a first mode (or configuration) during typical day-time operations, in a second mode (or configuration) during evening batch operations, in a third mode (or configuration) during end of month closing operations, and/or so forth. In some embodiments, mode switching can be triggered based on utilization rates of portions of virtual resources.

Although not shown, in some embodiments, the hardware resources and/or software resources of the data center 100 can include one or more levels of infrastructure. For example, in some embodiments, the hardware resources of the data center 100 can include, storage devices, host devices, access switches, aggregation devices, routers, interface components, cables, and/or so forth. Although the specifics are not shown in FIG. 1, one or more processing devices (e.g., host devices, storage devices) can be included in and/or integrally connected to the infrastructure of the data center 100. For example, the data center 100 can be configured so that the processing devices can be in communication with (e.g., coupled to) a layer of access switches that are in communication with (e.g., coupled to) a layer of aggregation devices. The aggregation devices can function as gateway devices into a set of routers/switches that function as core switching elements of the data center 100. The processing devices can be configured to communicate with one another via at least a portion of the infrastructure of the data center 100. In some embodiments, the data center 100 infrastructure can have a live side and a redundant side (which can function as a backup of the live side).

In some embodiments, the data center 100 can also include software resources, for example, management modules (such as management module 120), operating systems, hypervisors 110 (e.g., VMware hypervisor, Xen hypervisor, Hyper-V hypervisor), and/or so forth. The software resources can be configured to enable use of the hardware resources of the data center 100 in a particular fashion. For example, the hypervisors can be configured to facilitate (or enable) virtualization of hardware resources of processing device(s). The operating systems can be installed at hardware resources such as routers, aggregation devices, routers, core switching elements, and/or forth so that other software resources can function at these hardware resources in a desirable fashion.

In some embodiments, the data center 100 can be a cloud computing environment where the hardware resources and/or software resources are shared by multiple virtual resources associated with one or more users (e.g., clients, customers). In other words, the hardware resources (e.g., host devices, access switches, aggregation devices, core switching elements) and/or software resources (e.g., operating systems, hypervisors) can collectively define a virtualized environment within which the virtual resources (such as virtual resources 55) can operate. In some embodiments, the virtualized environment defined by the data center 100 can be referred to as a data center virtualized environment.

In some embodiments, one or more portions of the management module 120 (e.g., the monitoring module 124 of the management module 120) can be (or can include) a hardware-based module (e.g., an application-specific integrated circuit (ASIC), a digital signal processor (DSP), a field programmable gate array (FPGA)) and/or a software-based module (e.g., a module of computer code, a set of processor-readable instructions that can be executed at a processor). Although not shown, in some embodiments, the management module 120 can include one or more memory portions (e.g., a random access memory (RAM) portion, a shift register, a cache) that can be used during operation of one or more functions of the management module 120. In some embodiments, one or more of the functions associated with the management module 120 can be included in different modules (not shown) and/or combined into one or more modules (not shown).

In some embodiments, the management module 120 can be a centralized management module configured to handle data center management for the entire data center 100, or can be a de-centralized management module configured to handle management of only a portion of the data center 100. In some embodiments, the management module 120 can be configured to perform various functions in addition to management of movement of virtual resources 55. For example, the management module 120 can be configured to manage disaster recovery of the data center, virtual resource provisioning, event reporting, data center security, and/or so forth (which can be collectively referred to as management functions) via interactions with various potentially incompatible hypervisors executing within a data center environment. Specifically, the management module 120 can be configured to perform various management functions associated with the operation of virtual resources at host devices, which can each be operating hypervisors that have incompatible hypervisor platforms. A virtual resource when operating with a hypervisor that has a hypervisor platform can be referred to as operating within the hypervisor environment. When they have different hypervisor platforms (or because they operate based on different hypervisor platforms) hypervisors can be incompatible. For example, function calls and/or signaling protocols that can be used by a hypervisor based on a first hypervisor platform may not be compatibly used by another hypervisor based on a second hypervisor platform. The management module 120 can be configured to, for example, handle signaling so that the management module 120 can manage one or more virtual resources of a data center via a hypervisor independent of the platform of the hypervisor. The platform of a hypervisor can be defined, for example, by a particular runtime library, a functionality, an architecture, a communication protocol, an operating system, a programming language, a hypervisor version, and/or so forth. In some embodiments, the platform of a hypervisor can be, for example, based on a hosted software application architecture executing within an operating-system environment, or a native software application architecture that executes directly on the hardware of one or more host devices (not shown). More details related to a management module configured to perform various operations related to a data center environment are set forth in patent application 61/306,752, filed on Feb. 22, 2010, entitled, "Methods and Apparatus for Data Center Management Independent of Hypervisor Platform," which is incorporated herein by reference in its entirety.

As shown in FIG. 1, the processing device 150 is included in the infrastructure of the data center 100. In some embodiments, the processing device 150 can be disposed outside of the infrastructure of the data center 100. Although not shown, in some embodiments, the management module 120 can be accessed via a user interface, which can be configured so that a user (e.g., a data center administrator, a network administrator, a customer, a source owner) can send signals (e.g., control signals, input signals, signals related to instructions) to the management module 120 and/or receive signals (e.g., output signals) from the management module 120. In some embodiments, the user interface can be included in the processing device 150 and/or can be included in a client device (e.g., a remote client device) outside of the infrastructure of the data center 100.

In some embodiments, the memory 130 can be, for example, a random-access memory (RAM) (e.g., a dynamic RAM, a static RAM), a flash memory, a removable memory, and/or so forth. In some embodiments, at least some of the information stored in the memory 130 can define a database that can be implemented as, for example, a relational database, an indexed database, a table, and/or so forth. Although the memory 130 is shown as being local to the management module 120, in some embodiments, one or more portions of the databases 132, 134, and/or 136, which are stored in the memory 130, can be stored in a remote memory that can be accessed by the management module 120. For example, portions of the databases 132, 134, and/or 136 can be stored in a separate (e.g., a remote) storage device (e.g., storage facility) that can be accessed by the management module 120 via a network (e.g., a local area network (LAN), a wide area network (WAN), a mobile network such as a 3G network) (not shown). In some embodiments, one or more portions of the databases 132, 134 and/or 136 can be combined into or separated into one or more databases.

Figure 2:
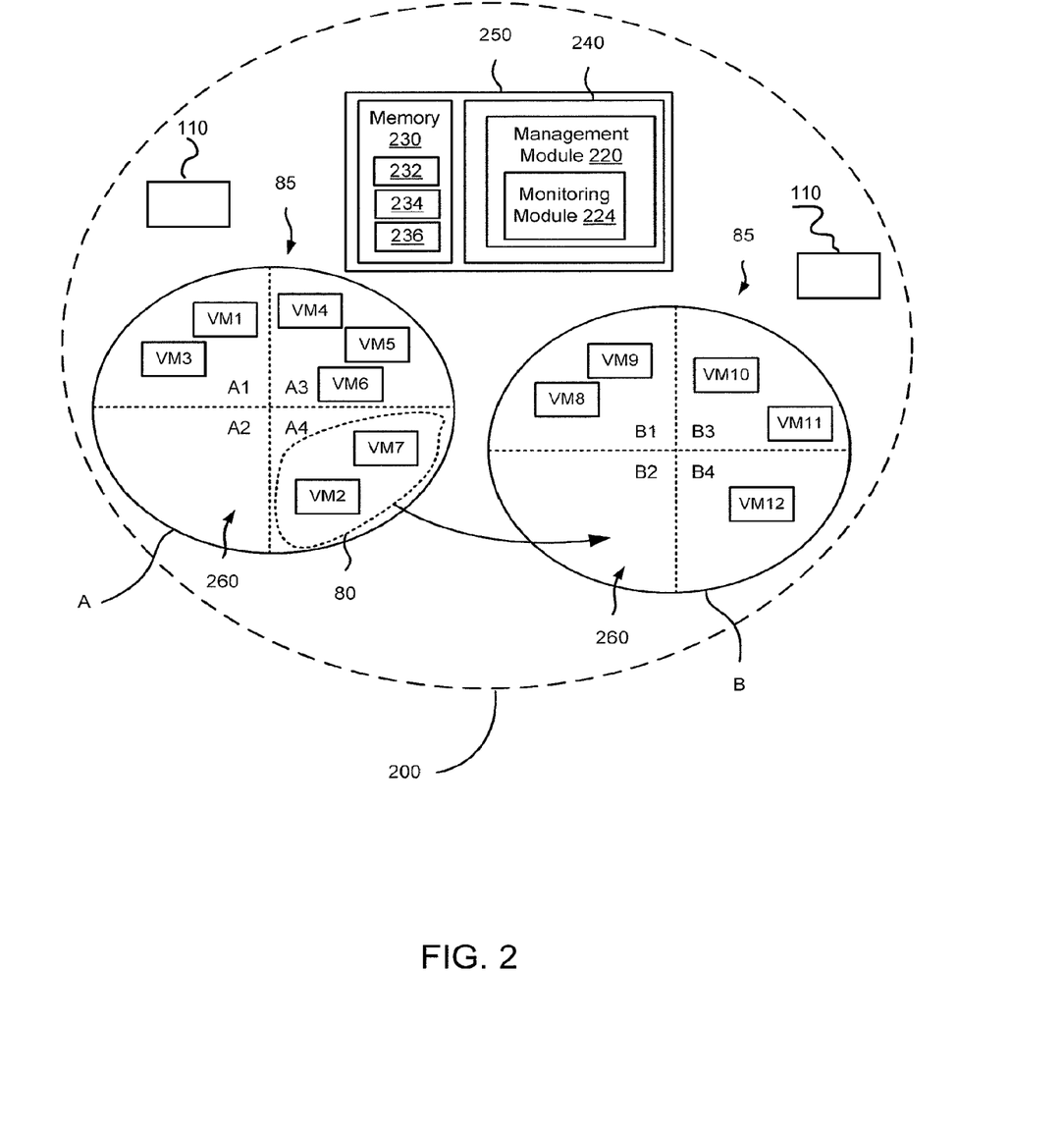
FIG. 2 is a schematic diagram that illustrates a set of virtual resources identified for movement from one data center cluster to another data center cluster, according to an embodiment.

FIG. 2 is a schematic diagram that illustrates a set of virtual resources 80 identified for movement from one data center cluster to another data center cluster, according to an embodiment. Specifically, FIG. 2 illustrates a set of virtual resources 80 being moved from data center cluster A to data center cluster B. In this embodiment, the data center cluster A can be referred to as a source data center cluster, and the data center cluster B can be referred to as a destination data center cluster. The set of virtual resources 80 moved from data center cluster A to data center cluster B includes virtual resources VM2 and VM7. As shown in FIG. 2, before the movement, the data center cluster A is configured to operate virtual resources VM1 through VM7 and the data center cluster B is configured to operate virtual resources VM8 through VM12. The virtual resources VM1 through VM12 can be collectively referred to as virtual resources 85.

The movement of the virtual resources 80 from data center cluster A to data center cluster B can be triggered by a management module 220 using a threshold condition database 232, an operational relationship database 234, and/or an availability database 236 stored in a memory 230. As shown in FIG. 2, the management module 220 can be executed within a processor 240 of a processing device 250 and the management module 220 can include a monitoring module 224.

Data center clusters (such as data center cluster A and B) can be defined by groups of host devices (e.g., a group of more than 2 host devices, a group of 8 host devices) that function, from the perspective of hypervisors installed within host devices of each of the data center clusters, as isolated virtual resource movement regions. For example, hypervisors installed within host devices of data center cluster A may be configured so that movement of virtual resources handled by the hypervisors can only occur between host devices that define the data center cluster A. The management module 220, which can manage virtual resources across data center clusters, can be configured to store information in the databases 232, 234, and/or 236 about multiple data center clusters (such as both data center cluster A and data center cluster B) so that the management module 220 can identify one or more of the virtual resources 85 for movement between data center cluster A and B. In some embodiments, one or more of the virtual resources 85 identified for movement between data center cluster A and data center cluster B can be performed automatically (e.g., triggered so that it occurs automatically), or performed manually (after being temporarily deactivated during movement).

As shown in FIG. 2, each of the data center clusters A, B has resources that are managed as data center units. Specifically, data center cluster A has resources that are managed as data center units A1 through A4, and data center cluster B has resources that are managed as data center units B1 through B4. As shown in FIG. 2, the set of resources 80 is moved from the resources managed as data center unit A4 (in data center cluster A) to the resources managed as data center unit B2 (in data center cluster B). The data center units can be collectively referred to as data center units 260.

In some embodiments, the data center units 260 can each be managed as a specified portion of resources (e.g., hardware resources, software resources, data center resources) of the data center 200. In other words, resources of the data center 200 can be divided into (e.g., partitioned into) data center units 260 that can be used, for example, to handle processing associated with one or more virtual resources. In some embodiments, the data center units 260 can be assigned for use by a specific user (e.g., assigned for operation of virtual resources of a user). For example, the resources managed as one or more of the data center units 260 can be used by a user, for example, to operate one or more virtual resources (such as virtual resource VM3) of the user. In some embodiments, the user can be a computing element (e.g., a server, a personal computer, a personal digital assistant (PDA), a data center administrator, a customer, a client, a company, and/or so forth.

In some embodiments, at least a portion of the information included in the availability database 236 can be based on the availability of the data center units 260 (or portions thereof). Accordingly, a virtual resource can be moved so that the virtual resource operates within the resources of data center unit 260 if the resources of the data center unit 260 are sufficient to support operation of the virtual resource.

In some embodiments, the management module 220 can be configured to move (or trigger movement of) virtual resources of a user only to one or more of the data center units 260 assigned to the user. Accordingly, the management module 220 can be configured to identify virtual resources for movement based on assignment of the data center units 260 to one or more users.

The management module 220 can be configured modify (or request authorization to modify) a number of data center units (which can be an integer number) assigned to a user in response to identification of one or more virtual resources for movement within the data center 200. For example, in some embodiments, the management module 220 can be configured to identify a set of virtual resource of a user for movement based on, for example, a set of performance metrics and a set of operational relationships. The management module 220 can be configured to modify (or request authorization to modify) a number of data center units (such as data center units 260) assigned to the user when the capacity of the data center units assigned to the user would be insufficient to support the movement of the set of virtual resources. In some embodiments, when virtual resources of a user are moved from operation at data center units at a first portion of the data center 200 to operation within data center units as a second portion of the data center 200 (which result in an increase in data center units assigned to the user at the second portion of the data center 200), data center units assigned to the user at the first portion of the data center 200 can be reduced.

In some embodiments, the hardware resources (and the associated software resources to support the hardware resources) of one or more of the data center units 260 can be managed so that they perform at (or are capable of performing at), for example, predefined resource limit values (e.g., predefined hardware resource limit values). Specifically, the hardware resources of one or more of the data center units 260 can managed so that they perform at, for example, a specified level of network bandwidth (e.g., 10 megabits/second (Mb/s) of network bandwidth, a specified level of network bandwidth of more than 1 Mb/s of network bandwidth), a specified level of processing speed (e.g., a processor speed of 300 megahertz (MHz), a processor speed of 600 MHz, a specific processor speed of more than 200 MHz), a specified input/output (I/O) speed of a storage device (e.g., a disk I/O speed of 40 I/O operations per second, a specified disk I/O speed of more than 10 IOPS), and/or a specified storage device bandwidth (e.g., a disk bandwidth of 10 Mb/s, a specified level of disk bandwidth of more than 10 Mb/s). A specified portion of hardware resources can also be reserved as part of one or more of the data center unit(s) 260. For example, the data center unit(s) 260 can also have a specified level of a storage device (e.g., a disk size of 30 gigabytes (GB), a specified disk size of more than 1 GB) and/or a specified memory space (e.g., a memory storage capacity of 768 megabytes (MB), a specified memory storage capacity of more than 64 MB) allocated to the data center unit(s) 260.

In some embodiments, the hardware resources (and accompanying software) of the data center 100 can be partitioned so that the hardware (and/or software) resources of the data center units 260 are guaranteed to perform at predefined resource limit values. In other words, the resources of the data center units 260 can be managed so that they provide guaranteed levels of service that correspond with each (or every) predefined resource limit value from a set of predefined resource limit values. More details related to management of resources related to data units are set forth in co-pending patent application Ser. No. 12/709,962, filed on Feb. 22, 2010, entitled, "Methods and Apparatus Related to Unit-Based Virtual Resources within a Data Center Environment," which is incorporated herein by reference in its entirety.

In some embodiments, a data center unit assigned to a user can be moved from a first portion of the data center 200 (such as data center cluster A) to a second portion of the data center 200 (such as data center cluster B). In other words, data center resources at the first portion of the data center 200 that are managed as the data center unit and assigned to the user can be replaced with data center resources at the second portion of the data center 200 so that they can be managed at the second portion of the data center 200 as the data center unit assigned to the user. Virtual resources of the user that were previously operated at the first portion of the data center 200 (and were previously managed as the data center unit) can be operated at the second portion of the data center 200 (and are newly managed as the data center unit) with the movement of the data center unit. In some embodiments, data center unit assignments can be used to account for data center resources (e.g., data center hardware resources, data center software resources) used to operate a virtual resource of a user.

FIGS. 3A through 3C are graphs that illustrate performance metric values associated with virtual resources, according to an embodiment. As shown in FIGS. 3A, 3B, and 3C, the values of performance metric X (shown on the y-axis) are plotted versus time (shown on the x-axis) for virtual resources V1, V2, and V3, respectively. As shown in FIG. 3A, the values of the performance metric X for virtual resource V1 are above a threshold limit value P1 before time T1, and the values of the performance metric X are below threshold limit value P1 after time T1. A monitoring module, such as monitoring module 134 shown in FIG. 1, can be configured to identify virtual resource V1 for movement from source resources of a data center based on the values of the performance metric X falling below the threshold limit value at time T1. In other words, the monitoring module 134 can be configured to identify the virtual resource V1 for movement within the data center in response to the values of the performance metric X satisfying a threshold condition associated with the threshold limit value P1.

Even though the values of the performance metric X for virtual resources V2 do not fall below the threshold limit value of P1, as shown in FIG. 3B, the virtual resource V2 can also be identified for movement within the data center based on an operational relationship between the virtual resource V1 and the virtual resource V2. Specifically, the virtual resource V2 can be identified by a management module for movement with the virtual resource V1 to a common destination portion (e.g., a common host device, a common data center cluster) of the data center based on an operational relationship between the virtual resource V2 and the virtual resource V1. The operational relationship can be determined based on operation relationship information related to the virtual resources V1, V2, and V3 stored in a database.

As shown in FIG. 3C, the values of the performance metric X for virtual resources V3, like the values of the performance metric X for virtual resource V2 (shown in FIG. 3B), do not fall below the threshold limit value of P1. However, the management module may determine that virtual resource V3 should not be moved with virtual resources V1 and V2 to a destination portion of a data center because a capacity of the destination portion of the data center is insufficient to operate all of the virtual resources V1, V2, and V3. In some embodiments, the identification of virtual resource V2 for movement with V1 rather than virtual resource V3 can be based on a rank ordering of the respective operational relationships of virtual resources V2 and V3 with virtual resource V1, a user preference, and/or so forth. In some embodiments, the virtual resource V3 may not be identified for movement with virtual resource V1 based on a value of a different performance metric (different than performance metric X) satisfying a threshold condition.

Figure 4A:
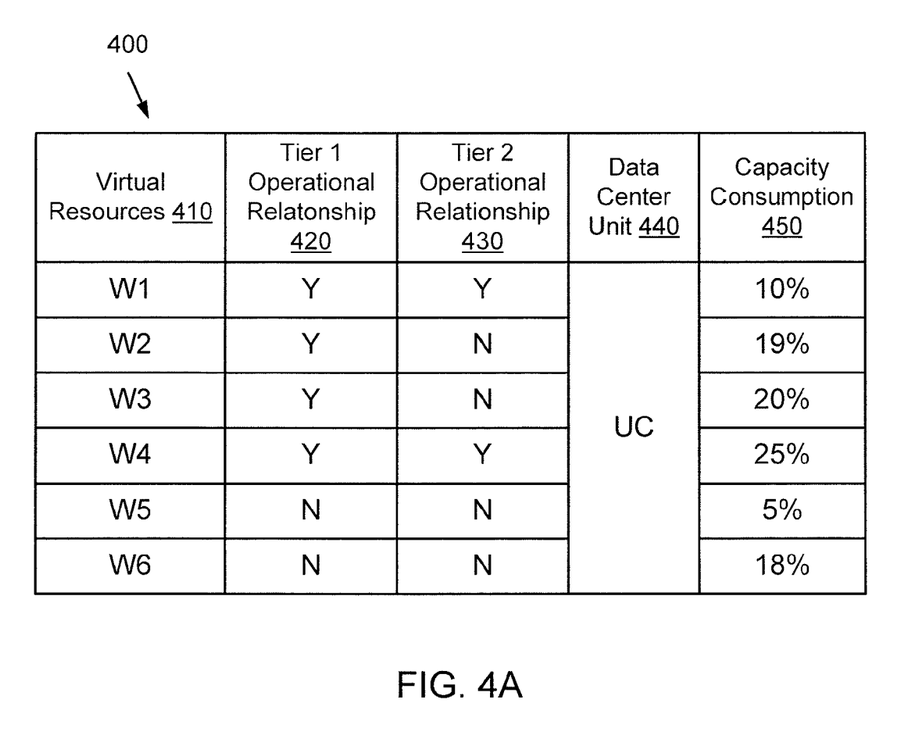
FIG. 4A illustrates a database that includes representations of operational relationships between virtual resources, according to an embodiment.
Figure 4B:
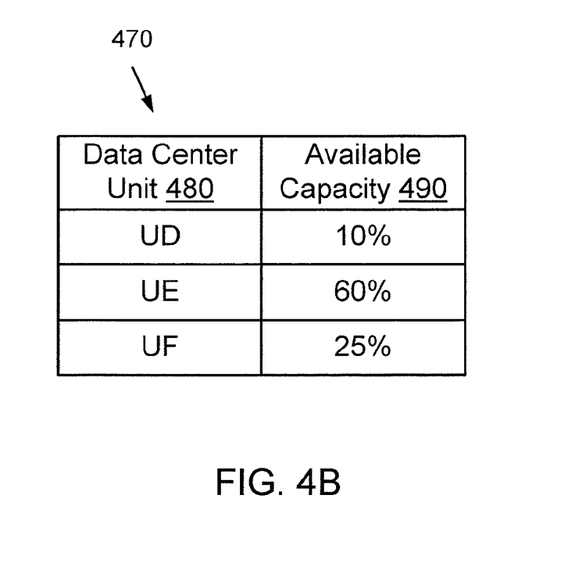
FIG. 4B illustrates a database that include available capacity values of data center units, according to an embodiment.

FIG. 4A illustrates a database 400 that includes representations of operational relationships between virtual resources, according to an embodiment. As shown in FIG. 4A, virtual resources W1 through W6 (shown in column 410) are operating at data center unit UC (shown in column 440). The portion of capacity consumption of the hardware resources managed as the data center unit UC are shown in column 450. Also as shown in FIG. 4A, the virtual resources 410 are associated with one or both of the operational relationships—tier 1 operational relationship (shown in column 420) and tier 2 operational relationship (shown in column 430).

In some embodiments, the "Y" values in the tier 1 operational relationship 420 can represent that the virtual resources 410 are associated with a particular user, and the "N" values can represent that the virtual resources 410 are not associated with the user. In some embodiments, the "Y" values in the tier 2 operational relationship 430 can represent that the virtual resource 410 has an operational dependency with other virtual resources 410 also designated with a "Y" value in the operational relationship. The virtual resources in the tier 2 operational relationship may be needed to operate at, for example, the same host device or have a specified topological proximity based on the operational dependency. The "N" values in the tier 2 operational relationship 430 can represent that the virtual resource 410 is not associated with other virtual resources 410 associated with the tier 2 operational relationship 430.

In some embodiments, the operational relationships can represent different operational relationships than those described above. For example, in some embodiments, the tier 1 operational relationship 420 can represent an optional operational dependency. In some embodiments, a database such as database 400 can include more or less than two operational relationships. In some embodiments, the operational relationships can overlap and/or can be hierarchically related. In some embodiments, the operational relationships can be rank ordered (e.g., can be associated with a priority) (not shown). In other words, the operational relationships can be rank ordered so that the operational relationships will be given precedence by a management module in accordance with the rank order. In some embodiments, the operational relationships can be defined by a data center administrator and/or defined by a user associated with the virtual resources 410.

In some embodiments, if a virtual resource is identified for movement within a data center by a management module, the management module can be configured to use information such as that shown in database 400 to identify additional virtual resources that should be moved with the virtual resource. For example, virtual resource W1 can be identified by a management module (e.g., a monitoring module of the management module) for movement based on a value of a performance metric associated with virtual resource W1 satisfying a threshold condition. In response to this identification, the management module can also be configured to identify virtual resource W4 as a virtual resource that is also to be moved with virtual resource W1 because these two virtual resources have an operational dependency as indicated in the database 400.

FIG. 4B illustrates a database 470 that includes available capacity values of data center units, according to an embodiment. As shown in FIG. 4B, the data center units (shown in column 480) UD, UE, and UF have available capacities (shown in column 490) of 10%, 60%, and 90%, respectively. In some embodiments, the resources (e.g., data center resources) associated with the data center units 480 can be referred to as a pool of resources (e.g., data center resources).

In some embodiments, the operational relationship information included in database 400 (shown in FIG. 4A) can be used in conjunction with database 470 (shown in FIG. 4B) to identify a destination data center unit for operation of one or more of the virtual resources if the virtual resource(s) are identified for movement to one of the data center units 480. For example, virtual resource W1 and virtual resource W4 can be identified for movement as a set of virtual resources based on their tier 2 operational relationship shown in FIG. 4A. Assuming that the resources of the data center unit UC (shown in column 440 of FIG. 4A) are the same as the resources associated with the data center units 480, the data center unit UE (shown in column 480), which has an available capacity of 60% (shown in column 490), is the only data center unit with sufficient capacity available to operate virtual resources W1 and W4, which consume a combined data center unit capacity of 35%.

In some embodiments, database 400 and database 470 can include information related to the association of the data center units and virtual resources to particular users represented by user identifiers. Accordingly, the movement of virtual resources and/or identification of destination data center resources (e.g., data center units) can also be determined by a management module based on the user identifiers. Specifically, the management module can be configured to only identify virtual resources associated with a particular user for movement to data center resources also associated with the same user.

Figure 5:
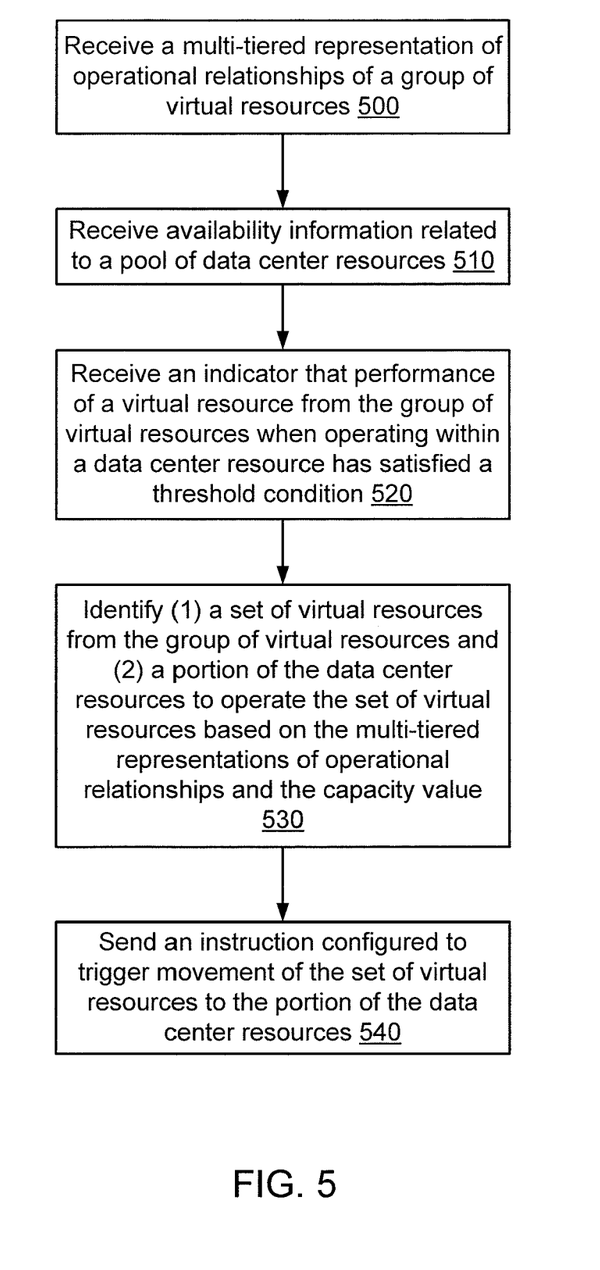
FIG. 5 is a flowchart that illustrates a method for identifying a set of virtual resources for movement within a data center, according to an embodiment.

FIG. 5 is a flowchart that illustrates a method for identifying a set of virtual resources for movement within a data center, according to an embodiment. As shown in FIG. 5, a multi-tiered representation (e.g., multi-tiered mapping) of operational relationships of a group of virtual resources is received, at 500. The multi-tiered representations can be similar to those shown in FIG. 4A.

Availability information related to a pool of data center resources is received, at 510. The available capacity values can be similar to those shown in FIG. 4B. In some embodiments, the pool of data center resources can be data center resources that are not assigned to a user.

An indicator that performance of a virtual resource from the group of virtual resources, when operating within a data center resource, has satisfied a threshold condition is received, at 520. In some embodiments, the performance can be related to a failure rate of the virtual resources when operating with the data center resource.

At 530, (1) a set of virtual resources from the group of virtual resources and (2) a portion of the data center resources to operate the set of virtual resources, are identified based on the multi-tiered representation of operational relationships and the availability information. In some embodiments, only a subset of the information associated with the multi-tiered representation of operation relationships and/or the availability information may be used by a management module to identify the set of virtual resources and the portion of the hardware resources to operate the set of virtual resources. In some embodiments, the portion of the hardware resources can be managed as data center units based on a set of predefined hardware resource limit values.

An instruction configured to trigger movement of the set of virtual resources to the portion of the data center resources is sent, at 540. In some embodiments, the instruction can be defined at and sent from a management module to another module (which can be in a different processing device than the management module). In some embodiments, the instruction can be sent to a module, separate from the management module, that is configured to move (or trigger movement) of the set of virtual resources to the portion of the data center resources. In some embodiments, the instruction can be defined at a management module and sent to a module within the management module configured to move (or trigger movement) of the set of virtual resource to the portion of the data center resources. In some embodiments, the instruction can be sent to, for example, a user via a user interface.

In some embodiments, one or more portions of the data center resources can be reconfigured so that the portion(s) of the data center resources can operate the set of virtual resources. For example, a hardware component of the data center can be configured (or reconfigured) so that the hardware component can operate at least a portion of the set of virtual resources in a desirable fashion. In some embodiments, a software resource (e.g., a hypervisor platform) of the data center can be configured (or reconfigured) so that the software resource can be used to operate at least a portion of the set of virtual resources in a desirable fashion.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using, for example, a run-time environment and/or an application framework such as a Microsoft .NET framework and/Java, C++, or other programming languages (e.g., object-oriented programming languages) and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, combinations of performance metric values can be used to identify a virtual resource for movement within a data center.

What is claimed is:

1. An apparatus implementing in at least one of a processor or a memory, comprising:

a monitoring module configured to send an indicator representing that performance of a first virtual resource satisfies a threshold condition; and a management module configured to move a set of virtual resources including the first virtual resource from a first portion of data center hardware resources to a second portion of data center hardware resources mutually exclusive from the first portion of data center hardware resources in response to the indicator, the management module configured to process a multi-tiered mapping of operational relationships between virtual resources including at least a first operational relationship between the virtual resources and a second operational relationship between the virtual resources, the management module configured to define and manage movement of the set of virtual resources based on the first operational relationship between the first virtual resource and the remaining virtual resources included in the set of virtual resources, the management module configured to exclude a second virtual resource from the set of virtual resources based on the second operational relationship between the first virtual resource and the second virtual resource, the second operational relationship being different from the first operational relationship.

2. The apparatus of claim 1, wherein the first portion of data center hardware resources is defined by a first set of data center units, each data center unit from the first set of data center units is managed based on a set of predefined hardware resource limits, the second portion of data center hardware resources is defined by a second set of data center units, each data center unit from the second set of data center units is managed based on the set of predefined hardware resource limits.

3. The apparatus of claim 1, wherein the first portion of data center hardware resources are associated with a first hypervisor platform, the second portion of data center hardware resources are associated with a second hypervisor platform different from the first hypervisor platform.

4. The apparatus of claim 1, wherein the threshold condition is based on an application event triggered by the first virtual resource when executing within the first portion of data center hardware resources.

5. The apparatus of claim 1, wherein
the management module is configured to exclude the second virtual resource from the set of virtual resources based on a capacity of the second portion of data center hardware resources.

6. The apparatus of claim 1, wherein the first portion of data center hardware resources are from a first data center cluster, the second portion of data center hardware resources are from a second data center cluster.

7. A non-transitory processor-readable medium storing code representing computer readable instructions to be executed by one or more processors, the code comprising code to:

process a multi-tiered mapping of operational relationships between virtual resources including at least a first operational relationship between the virtual resources and a second operational relationship between the virtual resources;

receive an indicator that a performance metric representing performance of a virtual resource within a source data center resource satisfies a threshold condition;

identify and manage movement of (1) a set of virtual resources from a plurality of virtual resources and (2) a portion of data center resources from a pool of data center resources to operate the set of virtual resources, based on a combination of the multi-tiered mapping of operational relationships between virtual resources from the plurality of virtual resources and availability information related to the pool of data center resources; and move a set of virtual resources including the first virtual resource from a first portion of data center hardware resources to a second portion of data center hardware resources mutually exclusive from the first portion of data center hardware resources in response to the indicator.

8. The non-transitory processor-readable medium of claim 7, wherein the multi-tiered mapping of relationships has a first tier of relationships based on a first type of operational relationship, the multi-tiered mapping of relationships has a second tier of relationships based on a second type of operational relationship different from the first type of operational relationship.

9. The non-transitory processor-readable medium of claim 7, wherein the source data center resource is from a first data center cluster, the portion of data center resources are from a second data center cluster, the portion of data center resources of the second data center cluster are mutually exclusive from the source data center resource of the first data center cluster, the performance metric represents performance of at least a portion of the virtual resource when executing within the source data center resource of the first data center cluster.

10. The non-transitory processor-readable medium of claim 7, wherein the source data center resource defines at least a portion of a data center unit that is managed based on a set of predefined resource limit values.

11. The non-transitory processor-readable medium of claim 7, wherein the source data center resource is from a first data center cluster, the portion of data center resources are from a second data center cluster, the portion of data center resources of the second data center cluster are mutually exclusive from the source data center resource of the data center cluster, the source data center resource of the first data center cluster defines at least a portion of a data center unit that is managed based on a set of predefined resource limit values, the pool of data center resources is defined by a plurality of data centers units that are each managed based on the set of predefined resource limit values.

12. The non-transitory processor-readable medium of claim 7, wherein the source data center resource is from a first data center cluster, the portion of data center resources are from a second data center cluster, the first data center cluster and the second data center cluster are managed by a single management module.

13. The non-transitory processor-readable medium of claim 7, wherein the indicator represents that at least a portion of the virtual resource has failed.

14. The non-transitory processor-readable medium of claim 7, wherein the availability information is based on a utilization of the pool of data center resources.

15. A non-transitory processor-readable medium storing code representing computer readable instructions to be executed by one or more processors, the code comprising code to:

process a multi-tiered mapping of operational relationships between virtual resources including at least a first operational relationship between the virtual resources and a second operational relationship between the virtual resources, identify and manage movement of a set of virtual resources based on the multi-tiered mapping of operational relationships between virtual resources and availability information related to a pool of data center resources;

receive an indicator that a performance metric representing performance of a virtual resource when executing within a first data center cluster satisfies a threshold condition, the first data center cluster being defined by a first hypervisor platform; and move, in response to the indicator, the first virtual resource and a second virtual resource having an operational relationship with the first virtual resource to a second data center cluster when the second data center cluster has hardware resources available to operate the first virtual resource and the second virtual resource, the second data center cluster being defined by a second hypervisor module different from the first hypervisor platform.

16. The non-transitory processor-readable medium of claim 15, wherein the virtual resource is configured to execute within a data center unit from a number of data center units of the first data center cluster, the code further comprising code to:
modify the number data center units of the first data center cluster in response to a request, the threshold condition is satisfied when the performance metric is changed in response to execution of the code to modify the number of data center units.

17. The non-transitory processor-readable medium of claim 15, wherein the hardware resources of the second data center cluster is defined by an integer number of data center units, each data center unit from the first set of data center units is managed based on a set of predefined hardware resource limit values.

18. The non-transitory processor-readable medium of claim 15, wherein the hardware resources of the second data center cluster are from a pool of unassigned hardware resources.

19. A method for managing virtual resources within a data center environment, the method comprising:

processing a multi-tiered mapping of operational relationships between virtual resources including a first operational relationship between virtual resources and a second operational relationship between the virtual resources;

processing an indicator representing that performance of the a virtual resource satisfies a threshold condition;

defining and managing movement of the virtual resources based on the multi-tiered mapping of operational relationships and availability information related to a pool of data center resources; and processing instructions to move a set of virtual resources including the first virtual resource from a first portion of data center hardware resources to a second portion of data center hardware resources mutually exclusive from the first portion of data center hardware resources in response to the indicator.

20. The method of claim 19, further comprising:

managing at least one data center unit from a first set of data center units based on a set of predefined hardware resource limits, wherein the first portion of data center hardware resources is defined by the first set of data center units;

managing at least one data center unit from a second set of data center units based on the set of predefined hardware resource limits, wherein the second portion of data center hardware resources is defined by the second set of data center units.

21. The method of claim 19, wherein the first portion of data center hardware resources are associated with a first hypervisor platform, the second portion of data center hardware resources are associated with a second hypervisor platform different from the first hypervisor platform.

22. The method of claim 19, wherein the threshold condition is based on an application event triggered by the first virtual resource when executing within the first portion of data center hardware resources.

23. The method of claim 19, further comprising excluding the second virtual resource from the set of virtual resources based on a capacity of the second portion of data center hardware resources.

24. The method of claim 19, wherein the first portion of data center hardware resources are from a first data center cluster, the second portion of data center hardware resources are from a second data center cluster.

25. The method of claim 20, wherein the first portion of data center hardware resources are from a first data center cluster, the second portion of data center hardware resources are from a second data center cluster.

* * * * *